(12) United States Patent
Runesson et al.

(10) Patent No.: US 7,121,538 B2
(45) Date of Patent: Oct. 17, 2006

(54) ARRANGEMENT AT A PRESS TOOL FOR BREAKING THE PISTON/PISTON ROD OF A GAS SPRING

(75) Inventors: Johan Runesson, Linkoping (SE); Tim Loose, Jonkoping (SE)

(73) Assignee: Stromsholmen AB, Tranas (SE)

( * ) Notice: Subject to any disclaimer, the term of this patent is extended or adjusted under 35 U.S.C. 154(b) by 227 days.

(21) Appl. No.: 10/478,831

(22) PCT Filed: May 15, 2002

(86) PCT No.: PCT/SE02/00916

§ 371 (c)(1),
(2), (4) Date: Nov. 26, 2003

(87) PCT Pub. No.: WO02/097295

PCT Pub. Date: Dec. 5, 2002

(65) Prior Publication Data

US 2004/0178548 A1 Sep. 16, 2004

(30) Foreign Application Priority Data

May 31, 2001 (SE) .............................. 0101915

(51) Int. Cl.
*F16F 9/02* (2006.01)

(52) U.S. Cl. ........................ 267/113; 267/119

(58) Field of Classification Search .............. 267/113, 267/119, 64.11, 64.15, 64.16, 64.17, 116, 267/114, 124, 126, 128
See application file for complete search history.

(56) References Cited

U.S. PATENT DOCUMENTS

| | | | |
|---|---|---|---|
| 475,582 A | 5/1892 | Little | |
| 645,683 A | 3/1900 | Graham | |
| 3,726,458 A | 4/1973 | Rabl | |
| 4,570,912 A | 2/1986 | Dodson et al. | |
| 4,700,611 A | 10/1987 | Kaneko | |
| 4,792,128 A | 12/1988 | Holley | |
| 4,796,871 A | 1/1989 | Bauer et al. | |
| 5,172,892 A | 12/1992 | Wallis | |
| 5,193,433 A | 3/1993 | Reimer | |
| 5,823,513 A | 10/1998 | Stenquist | |
| 6,170,809 B1 * | 1/2001 | Cotter | ........................ 267/119 |

FOREIGN PATENT DOCUMENTS

| | | |
|---|---|---|
| DE | 34 41 005 | 5/1985 |
| DE | 36 10 751 | 3/1986 |
| DE | 35 46 236 | 7/1987 |
| DE | 38 04 081 | 8/1989 |
| DE | 195 34 683 | 3/1997 |
| DE | 196 37 291 | 5/1997 |
| DE | 197 32 761 | 3/1998 |
| EP | 0 209 909 | 1/1987 |
| EP | 0 617 202 | 9/1994 |
| EP | 0 648 941 | 4/1995 |
| EP | 9 959 263 | 11/1999 |
| EP | 1 074 759 | 2/2001 |
| EP | 1 113 185 A3 | 7/2001 |
| EP | 1 113 185 A2 | 7/2001 |
| EP | 1 057 550 | 1/2002 |
| GB | 1 226 534 | 3/1971 |
| GB | 2 008 716 | 6/1979 |
| GB | 2 042 640 | 9/1980 |
| WO | 90/03523 | 5/1990 |
| WO | 00/05517 | 2/2000 |

* cited by examiner

*Primary Examiner*—Matthew C. Graham
(74) *Attorney, Agent, or Firm*—Merchant & Gould P.C.

(57) ABSTRACT

The invention relates to an arrangement in a pressing tool for braking the return movement of pistons/piston rods (D1) of gas-filled springs (D) and thereby also of a sheet metal holder (B) supported thereon after pressing has been performed. The invention is characterised in that each gas-filled spring device (D) is designed with a separate brake cylinder part (E) and brake piston part (F), in which the brake cylinder part (E) is situated adjoining the outer end of the gas-filled spring (D) and in which the brake piston part (F) is situated adjoining the inner end of the piston rod (D1).

3 Claims, 3 Drawing Sheets

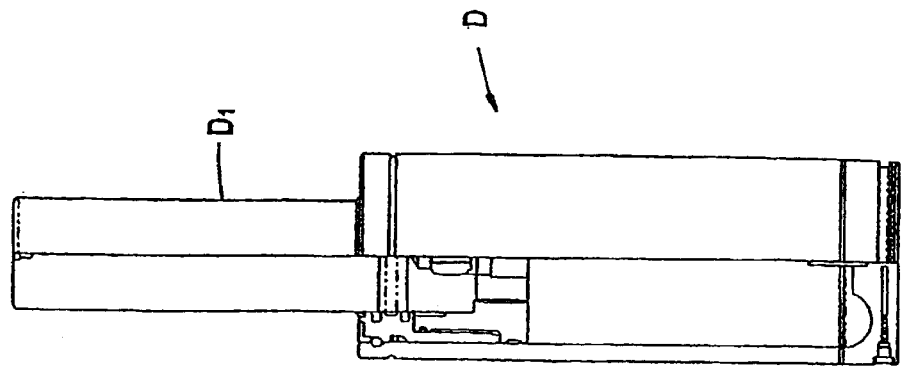
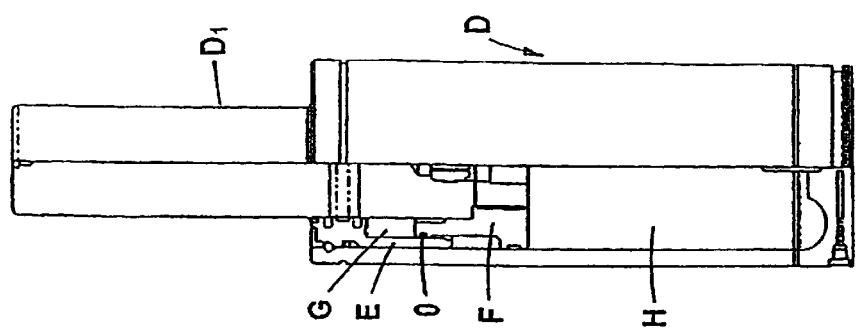
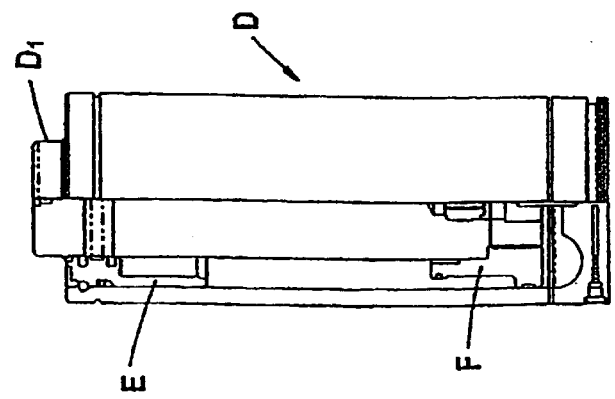

ARRANGEMENT AT A PRESS TOOL FOR BREAKING THE PISTON/PISTON ROD OF A GAS SPRING

The present invention relates to an arrangement in a pressing tool, more specifically in a pressing tool in which the forming process is performed using a sheet metal holder supported by a gas-filled spring, which holds the sheet metal throughout the forming process.

In sheet-metal forming operations, use is made of tools fitted in a press. The upper part of the tool follows the movement of the press slide throughout, while other parts, such as the said sheet metal holder, for example, are at rest during a part of the press cycle. The springs which support the sheet metal holder are loaded or tensioned in the pressing process and retain the sheet metal fabrication securely during forming, to be relieved and expanded during the upward movement of the press slide and upper part of the press after sheet metal forming has been carried out. There is a risk at this point of the sheet metal holder lifting off from the gas-filled springs and of the finished sheet metal fabrication coming loose uncontrollably from the sheet metal holder if the negative g-force (the retardation) becomes too great during the braking adjacent to the limit positions of the gas-filled springs. If the springs are braked too rapidly after return, the holder will not come to a stop when the springs reach their limit positions, but risks travelling on to be braked by the g-force, whereupon it falls back down on to the springs. This "jump" by the holder (blank holder bounce) causes wear and generates noise. There is also a risk of the holder itself jumping out of its guides.

An example of the known technology in this area is given in EP-A-1074759.

The main object of the present invention is therefore to provide an arrangement in a pressing tool that eliminates the risk of the holder lifting off from the gas-filled springs.

Another object of the invention is to provide an arrangement which incorporates a damping/braking of the piston/piston rod movement of the gas-filled spring and hence also of the movement of the holder adjacent to the extended limit position, by using existing components of the press.

According to the invention the aforementioned objects are achieved by an arrangement having the characteristics specified in the claims.

By incorporating a limit position damper into the gas-filled springs forming part of the main springs in the press, that is to say springs with a capacity of almost 10 tonnes per spring in large presses, it is easily possible to control the retardation both of the springs and of the holder, so as to achieve gentle braking both of the holder part and then also of the finished pressed part once pressing has been carried out.

Figure 1A:
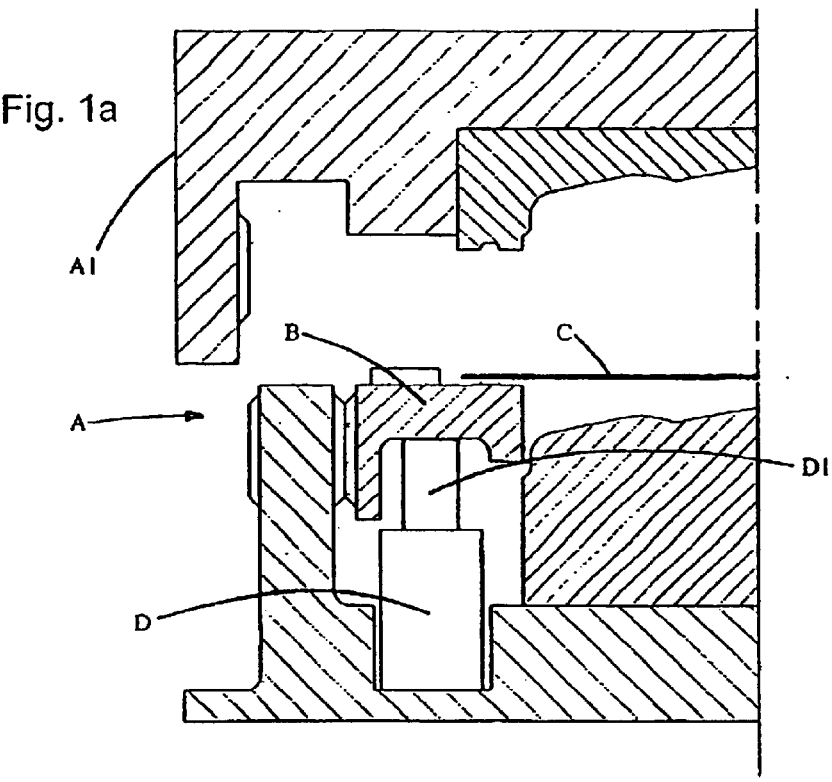
Figure 1B:
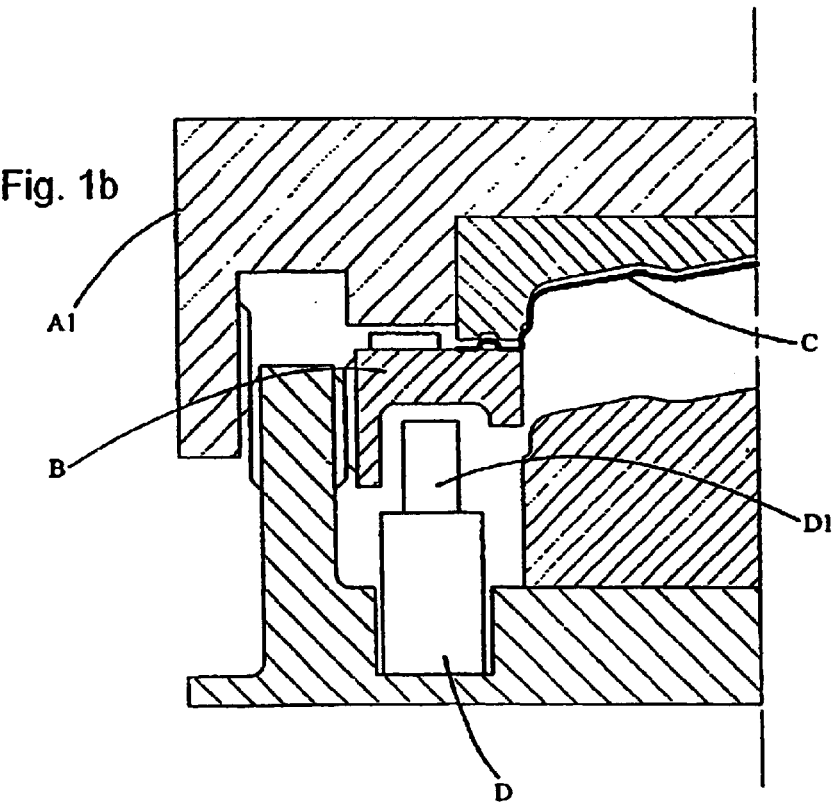
Figure 3:
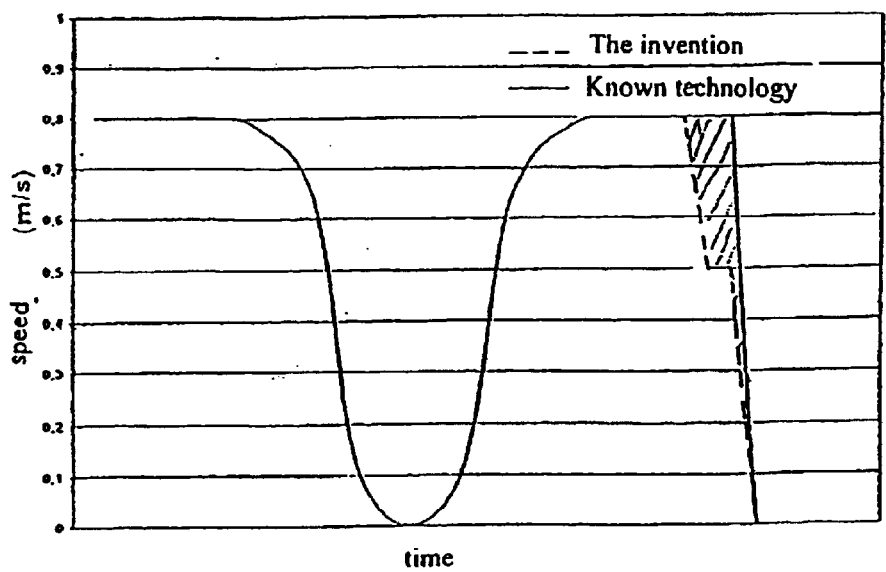
Figure 4:
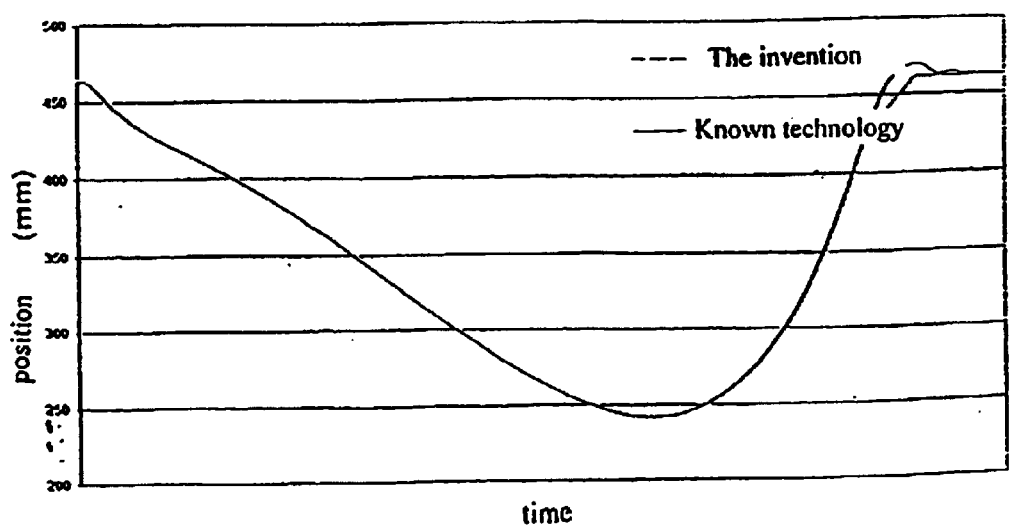

The invention will now be described in connection with an example of an embodiment shown in drawings attached, in which:

FIGS. 1a and 1b show diagrams of a part of a known pressing tool with sheet metal holder and sheet metal fabrication before and immediately after the forming process, FIGS. 2a–c show diagrammatic cross-sections through a modified gas-filled spring arrangement according to the invention permitting a braking/limit-position damping and at various degrees of extension, FIG. 3 shows a comparative diagram of the speed profiles for the piston rod of a gas-filled spring during a press cycle—with and without the present invention, and FIG. 4 shows a likewise comparative diagram of the movement of the holder during a press cycle—with and without the present invention.

FIG. 1a shows diagrams of a part of a known pressing tool A with sheet metal holder B and sheet metal fabrication C immediately prior to the forming process, while FIG. 1b shows the holder part B of the same known pressing tool isolated from the underlying gas-filled spring piston D on completion of the press cycle.

FIG. 2a shows a first cross-sectional view through a modified gas-filled spring arrangement D according to the invention with brake cylinder part E and brake piston part F permitting a limit-position braking/damping on attainment of the extended position—here shown in its fully nested position, however—while FIG. 2b shows the gas-filled spring arrangement D with its piston/piston rod D1 in a position in which a braking has been initiated by uniting of the brake cylinder part E and the brake piston part F and the formation of a sealed chamber G. FIG. 2c shows the gas-filled spring arrangement D with piston/piston rod D1 in a fully nested limit position, in which the braking action ceases. In order to be able to control the braking of the piston/piston rod, the brake cylinder part E is sealed by an external sealing ring O adjacent to the inner end of the piston/piston rod D1. A bore (not shown) between the brake/damper chamber formed and the rest of the inside of the gas cylinder is designed so that a desired braking characteristic is obtained for the piston/piston rod D1.

FIG. 3 shows a comparative diagram of the speed profiles for the piston/piston rod of a gas-filled spring during a press cycle—by a dashed line in the case of an arrangement with the present invention and by a solid line in that of a conventional arrangement without built-in limiting of the speed of the piston/piston rod speed at the outer limit position. The dashed area in FIG. 3 is a measurement of the damping of the piston rod movement that is obtained.

FIG. 4 shows the comparative diagram for the movement of the holder during a press cycle—with and without an arrangement according to the present invention, the solid and the dashed line respectively showing the difference between the controlled (damped) braking of the holder and the uncontrolled holder braking. The latter results in the holder coining loose from the pistons of the gas-filled springs.

The invention is not limited to the example of an embodiment described above, but lends itself to modifications without departing from the scope of the claims specified below.

What is claimed is:

1. Arrangement in a pressing tool for braking a piston/piston rod (D1) of a gas-filled spring (D) and thereby also the return movement of a sheet metal holder (B) supported thereon after pressing has been performed, wherein the gas-filled spring (D) is designed with a separate brake cylinder part (E) and brake piston part (F), in which the brake cylinder part (E) is situated adjoining the outer end of the gas-filled spring (D) and in which the brake piston part (F) is situated adjoining the inner end of the piston rod (D1), whereby during an initial phase of the return movement, the brake cylinder part and the brake piston part are separated from each other, and whereby during a final phase of the return movement, the brake cylinder part and the brake piston part unite so as to form an annular brake/damper chamber, which is substantially sealed from a remainder of the internal space of the gas-filled spring, such that the piston/piston rod is braked only during said final phase of the return movement.

2. Arrangement according to claim 1, wherein a seal (O) is arranged between brake piston part (F) and brake cylinder part (E).

3. Arrangement according to claim 1, wherein a bore is accommodated between the annular brake/damper chamber (G), formed by a brake piston (F) and brake cylinder part (E), and said remainder of the internal cylindrical space (H) of the gas-filled spring (D).

* * * * *